July 16, 1946.   F. W. AHALT   2,404,157
METHOD OF BONDING STRUCTURES
Filed Sept. 8, 1943

INVENTOR.
F. W. AHALT
BY
ATTORNEY

Patented July 16, 1946

2,404,157

UNITED STATES PATENT OFFICE 2,404,157

METHOD OF BONDING STRUCTURES

Frank W. Ahalt, Downers Grove, Ill., assignor to Western Electric Company, Incorporated, New York, N. Y., a corporation of New York Application September 8, 1943, Serial No. 501,544

6 Claims. (Cl. 219—10)

This invention relates to a method of bonding structures, and more particularly to a method of bonding structures comprising a plurality of parts formed of tungsten.

In the manufacture of incandescent lamps and of electronic emission devices, such as may be positioned in a vacuum tube, it is sometimes the practice to employ a filament of tungsten, which is capable of withstanding considerable heat over long periods of operation. This filament may be mounted between a pair of spaced tungsten lead wires which serve as electrodes and supporting elements and the filament may be attached to the upper ends of the lead wires by welding.

One method of welding has been to arc weld the tungsten filament to the tungsten lead wires in a hydrogen atmosphere using a carbon electrode. However, because of the high temperature present in a carbon arc and necessary to melt the tungsten, both the tungsten filament and lead wires were sometimes embrittled in the areas adjacent the joints due to the formation of tungsten carbide in that area because of carbon mixing with the tungsten, the carbon being supplied from the carbon electrode, and also due to crystallization of the tungsten caused by the excessive heat, which is on the order of 7000° F., generated during the welding process. Since the welded assembly may be employed in lamps or tubes which may be subjected to considerable shocks and vibrations during use, this embrittlement of the filament and lead wires tends to reduce their useful life.

An object of the present invention is to provide an improved and an efficient and effective method of bonding structures.

In accordance with the present invention, a tungsten filament may be bonded to a tungsten lead wire by using a nickel electrode and a current sufficient to cause the nickel to be deposited over the juncture of the tungsten elements to form in effect a brazed union between the elements, the union being made at a temperature substantially lower than the melting temperature of the tungsten.

Figure 1:
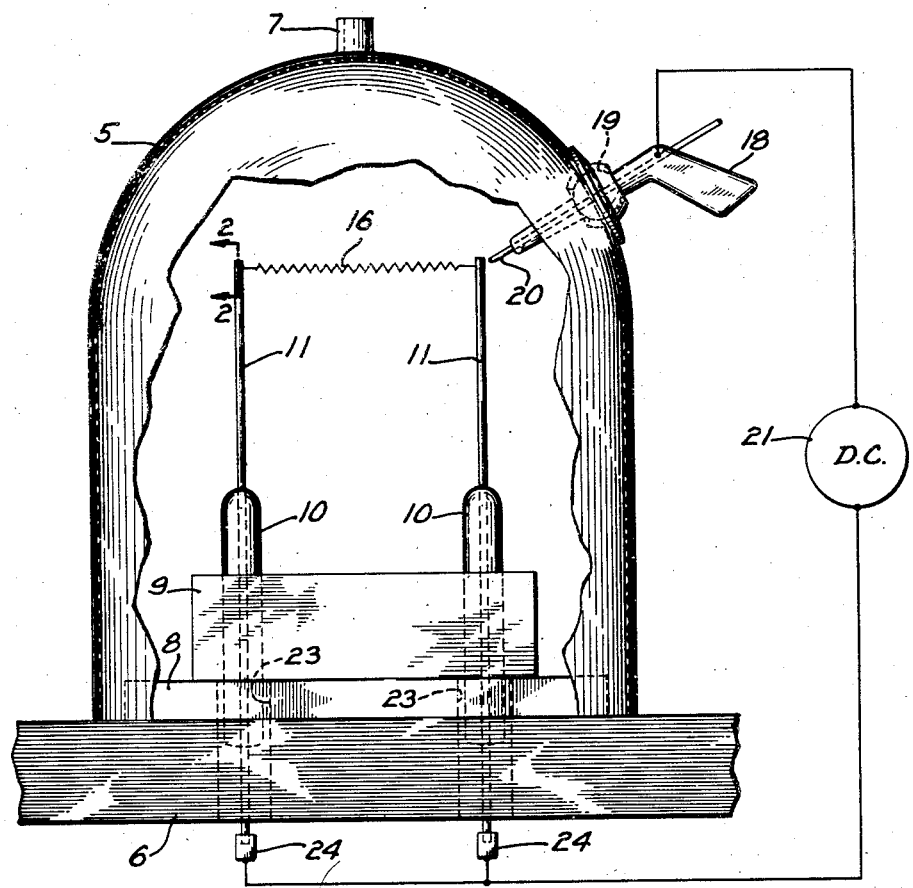
Figure 2:
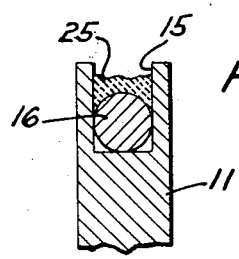

Other objects and advantages of the present invention will be apparent from the following detailed description taken in conjunction with the accompanying drawing, wherein Fig. 1 shows diagrammatically an apparatus which may be used in accordance with the present invention; and Fig. 2 is an enlarged sectional view along the line 2—2 of Fig. 1 showing a completed joint.

Referring to the drawing, and particularly to Fig. 1, an apparatus is there shown which may be employed in following the method of this invention. As shown in Fig. 1, a hood 5, or bell, is positioned on a table 6 and may be supplied with hydrogen through a port 7 formed in the upper portion of the hood 5, it being desirable that the bonding operation take place in a non-oxidizing atmosphere, such as hydrogen, in order to reduce so far as possible oxidation of the metallic elements. Positioned within the hood 5 and mounted on the table 6 is a base plate 8 which serves as a support for a base member 9 of an assembly to be welded. As shown in this drawing, two spaced parallel glass tubes 10 extend vertically through the assembly base 9 and two lead wires 11, which are made of tungsten, are positioned in these tubes and extend substantially beyond the ends thereof. The glass tubes, which may be fused to the lead wires, serve to insulate the lead wires from the base member 9. The upper end of each lead wire 11 is provided with a notch 15, as shown in Fig. 2, and the ends of a tungsten filament wire 16 rest in these notches, the filament being positioned between and supported by the lead wires which are substantially thicker than the filament wire 16.

An electrode holder 18 is universally supported in a ball and socket joint 19 mounted in the hood 5 and serves as a support for an electrode 20 which is made of nickel. In changing from a carbon-type electrode to a metallic electrode, a metal must be selected which will itself withstand the high temperatures encountered when the tungsten filament becomes incandescent during operation, as well as a metal which will form a mechanically strong joint between the tungsten lead wires and the tungsten filament. Nickel, as used in accordance with this invention, meets these requirements fully.

It will be noted that the electrode holder 18 is so positioned that the end of the nickel electrode 20 may be moved into contact with the upper end of the lead wire 11. In some cases, the bonding operation may be expedited by making the supporting plate 8 rotatable and providing a mechanism (not shown) operable from outside of the hood 5 to rotate the table to bring each lead wire into position adjacent the electrode 20. The electrode 20 is connected to one side of a source 21 of direct current, such as a direct current generator, and each lead wire 11 is connected to the other side of the same source. As may be seen in Fig. 1, the mounting plate 8 is provided with recesses 23 through which the lower portions of the lead wires 11 extend, the table 6 being similarly apertured, and a pair of clips 24 of electrically conductive material is attached to the lower ends of the lead wires 11 and connected to the direct current source 21.

In the operation of this apparatus, it is generally preferable to strike the arc between the electrode 20 and the lead wire 11 rather than between the electrode 20 and the filament 16 since the filament is usually formed from a substantially smaller diameter wire than the lead wire and, consequently, is more likely to be burned through than are the lead wires. In practice, an arc voltage of 25 to 30 volts at from 12 to 15 amperes may be used and the arc is held for a short period of time, generally less than a second. Under these conditions, and using as an electrode a wire having a diameter of approximately .03", a readily visible deposit 25 of nickel will be formed at the junction of the lead wire and the filament wire and will provide a mechanically strong joint therebetween.

In uniting the parts, in accordance with this invention, an arc having a temperature substantially below the melting point of tungsten, which is approximately 6100° F., but considerably above the melting point of nickel, which is approximately 2645° F., is used. The speed of the operation is such that substantially no nickel is lost in spite of the relatively high temperature, while on the other hand, the high temperature is sufficient to cause the surface of the tungsten lead wire and the tungsten filament wire to soften somewhat in the area of the joint, thus forming a joint very similar to that obtained by brazing.

By using an arc having a temperature below the melting point of tungsten, crystallization of the tungsten is kept at a minimum since very little grain growth occurs in the tungsten when exposed to the temperature used for the short welding period required in accordance with this invention. At the same time, by eliminating the carbon electrode, the formation of tungsten carbide, which is very brittle, in the area of the joint is completely avoided. In addition, the nickel which is deposited on the parts acts as a reinforcement to the wires in that area. Results obtained by following this process have been exceptionally satisfactory and have resulted in an appreciable reduction of failures as a result of breaking of the filament wires, which is largely due to embrittlement of the tungsten adjacent the welding areas during subsequent handling of the welded assembly.

What is claimed is:

1. A method of uniting tungsten parts comprising assembling the parts in the desired relation, and applying an arc from a nickel electrode to the junction of the parts to deposit nickel thereon and unite the parts.

2. A method of uniting tungsten parts comprising assembling the parts in the desired relation, applying an arc from a nickel electrode to the junction of the parts, and depositing nickel on the junction of the parts to reinforce the junction.

3. A method of uniting tungsten parts comprising assembling the parts, and applying an arc from a nickel electrode to the junction of the parts to deposit nickel thereon and unite the parts, the arc being applied in a hydrogen atmosphere.

4. A method of uniting tungsten parts comprising assembling the parts, and applying an arc from a nickel electrode to the junction of the parts to deposit nickel thereon and unite the parts, the arc being applied in a non-oxidizing atmosphere.

5. A method of uniting tungsten parts comprising assembling the parts, and applying an arc from a nickel electrode to the junction of the parts to cause nickel to be deposited on the junction of the parts to reinforce the junction, the arc being applied in a hydrogen atmosphere.

6. A method of uniting tungsten parts comprising assembling the parts, drawing an arc from a nickel electrode at a temperature below the melting point of tungsten and above the melting point of nickel, and depositing nickel over the juncture of said parts.

FRANK W. AHALT.